US010878287B2

(12) United States Patent
Viswanathan (10) Patent No.: US 10,878,287 B2
(45) Date of Patent: Dec. 29, 2020

(54) METHOD AND APPARATUS FOR CULLING TRAINING DATA

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 85 days.

(21) Appl. No.: 16/209,081

(22) Filed: Dec. 4, 2018

(65) Prior Publication Data
US 2020/0175333 A1  Jun. 4, 2020

(51) Int. Cl.
*G06K 9/62* (2006.01)
*G01C 21/32* (2006.01)
*G05D 1/02* (2020.01)
*G06N 3/08* (2006.01)

(52) U.S. Cl.
CPC ........... *G06K 9/6257* (2013.01); *G01C 21/32* (2013.01); *G05D 1/0246* (2013.01); *G06N 3/08* (2013.01)

(58) Field of Classification Search
CPC .... G06K 9/6257; G01C 21/32; G05D 1/0246; G06N 3/08; G06N 5/045
See application file for complete search history.

(56) References Cited

U.S. PATENT DOCUMENTS

2017/0357851 A1\* 12/2017 Segalovitz ........... G06K 9/4628
2018/0144241 A1   5/2018 Liu et al.

FOREIGN PATENT DOCUMENTS

CN   108038853 A   5/2018

OTHER PUBLICATIONS

Fan, Y. et al., *Learning What Data to Learn*, [online] [retrieved Feb. 1, 2019], Retrieved from the Internet: <URL: https://arxiv.org/pdf/1702.08635.pdf>, (Feb. 28, 2017) 10 pages.
Hadjadji, B. et al., *Optimized Selection of Training Sample for One-Class Neural Network Classifer*, 2014 International Joint Conference on Neural Networks (Jul. 2014) 345-349.
Huang, S.-J. et al., *Cost-Effective Training of Deep CNNs With Active Model Adaptation*, [online] [retrieved Jan. 31, 2019]. Retrieved from the Internet: <URL: https://arxiv.org/pdf/1802.05394.pdf>, (Jun. 5, 2018) 9 pages.

(Continued)

*Primary Examiner* — Diane D Mizrahi
(74) *Attorney, Agent, or Firm* — Alston & Bird LLP (57) ABSTRACT

Methods described herein relate to culling training data for machine learning in a neural network. Methods may include: receiving sensor data from at least one image sensor, where the sensor data is representative of at least one image; processing the at least one image using a neural network; identifying a number of neurons of the neural network that are activated for each of the at least one image; identifying an image as an informative training image in response to the number of neurons activated for the respective image satisfying a predetermined value; and updating the neural network with the informative training image in response to at least one object of the informative training image being manually labeled. The at least one image may be a plurality of images, where the predetermined value may be established based on a distribution of a number of neurons fired for the plurality of images.

20 Claims, 5 Drawing Sheets

(56) References Cited

OTHER PUBLICATIONS

Mahapatra, D. et al., *Efficient Active Learning for Image Classification and Segmentation Using a Sample Selection and Conditional Generative Adversarial Network*, [online] [retrieved Jan. 31, 2019]. Retrieved from the Internet: <URL: https://arxiv.org/pdf/1806.05473.pdf>. (Jun. 22, 2018) 8 pages.

Yang, L. et al., *Suggestive Annotation: A Deep Active Learning Framework For Biomedical Image Segmentation*, [online] [retrieved Jan. 31, 2019]. Retrieved from the Internet: <URL: https://arxiv.org/pdf/1706.04737.pdf>. (Jun. 15, 2017) 8 pages.

Zhou, Z. et al., *Fine-Tuning Convolutional Neural Networks for Biomedical Image Analysis: Actively and Incrementally*, [online] [retrieved Jan. 31, 2019]. Retrieved from the Internet: <URL: https://openaccess.thecvf.com/content_cvpr_2017/papers/Zhou_Fine-Tuning_Convolutional_Neural_CVPR_2017_paper.pdf>. (2017) 7340-7351.

\* cited by examiner

METHOD AND APPARATUS FOR CULLING TRAINING DATA

TECHNOLOGICAL FIELD

Example embodiments of the present invention relate generally to culling training data for machine learning in a neural network, and more particularly, to automatically identifying the most informative training data examples and culling training data that is of limited benefit for the neural network.

BACKGROUND

Road geometry modelling is very useful for map creation and identification of objects of interest in environments, such as road signs along a road segment. Such object identification may facilitate autonomous vehicle navigation along a prescribed path. Traditional methods for modelling of road geometry and object or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

Some current methods rely upon feature detection from image data to perform object identification, but these methods have deficiencies. For instance, some systems designed for object detection/identification around a vehicle exist, but may be unreliable. Further, the reliability of object detection may not be known such that erroneous object detection or lack of object detection may adversely impact autonomous or semi-autonomous driving. Over-estimating the accuracy of object detection may cause safety concerns as object locations may be improperly interpreted as accurate when they are actually inaccurate, while under-estimating accuracy may lead to inefficiencies through overly cautious behaviors. Further, map data reconstruction of an environment may be inaccurate if object identification does not properly establish the location of an object in an environment.

BRIEF SUMMARY

Accordingly, a method, apparatus, and computer program product are provided for culling training data for machine learning in a neural network, and more particularly, to automatically identifying the most informative training data examples and culling training data that is of limited benefit for the neural network. Embodiments described herein may provide an apparatus including at least one processor and at least one non-transitory memory including computer program code instructions. The computer program code instructions configured to, when executed, cause the apparatus to at least: receive sensor data from at least one image sensor, where the sensor data is representative of at least one image; process the at least one image using a neural network; identify a number of neurons of the neural network that are activated for each of the at least one image; identify an image as an informative training image in response to the number of neurons activated for the respective image satisfying a predetermined value; and update the neural network with the informative training image in response to at least one object of the informative training image being manually labeled.

According to some embodiments, the at least one image may be a plurality of images, where the predetermined value is established based, at least in part, on a distribution of a number of neurons fired for the plurality of images. The predetermined value may be established such that only a subset of the plurality of images are informative training images. The apparatus of some embodiments may be caused to: provide the image identified as an informative training image to a queue for manual labeling; and receive the image identified as an informative training image including at least one labeled object within the image in response to the informative training image being manually labeled. The apparatus may optionally be caused to receive sensor data representative of a second image, where the second image includes an image of at least one object; and identify, using the neural network, the at least one object in the second image automatically without manual input. The apparatus may be caused to provide for autonomous vehicle control based, at least in part, on identifying the object in the second image, where the second image is an image of an environment of a vehicle for which autonomous vehicle control is provided. The apparatus may be caused to provide for a map update to a digital map in a map database based, at least in part, on identifying the at least one object in the second image.

Embodiments provided herein may include a computer program product including at least one non-transitory computer-readable storage medium having computer-executable program code instructions stored therein. The computer-executable program code instructions including program code instructions to: receive sensor data from at least one image sensor, where the sensor data is representative of at least one image; process the at least one image using a neural network; identify a number of neurons of the neural network that are activated for each of the at least one image; identify an image as an informative training image in response to the number of neurons activated for the respective image satisfying a predetermined value; and update the neural network with the informative training image in response to at least one object of the informative training image being manually labeled. The at least one image may be a plurality of images, where the predetermined value may be established based, at least in part, on a distribution of a number of neurons fired for the plurality of images. The predetermined value may be established such that only a subset of the plurality of images are informative training images.

The computer program product of some embodiments may optionally include program code instructions to: provide the image identified as an informative training image to a queue for manual labeling; and receive the image identified as an informative training image including at least one labeled object within the image in response to the informative training image being manually labeled. The computer program product may include program code instructions to: receive sensor data representative of a second image, where the second image includes an image of at least one object; and identify, using the neural network, the at least one object in the second image automatically without manual input. The computer program product may include program code instructions to provide for autonomous vehicle control based, at least in part, on identifying the object in the second image, where the second image is an image of an environment of a vehicle for which autonomous vehicle control is provided. The computer program product may include program code instructions to provide for a map update to a digital map in a map database based, at least in part, on identifying the at least one object in the image.

Embodiments described herein may provide a method including: receiving sensor data from at least one image sensor, where the sensor data is representative of at least one image; processing the at least one image using a neural network; identifying a number of neurons of the neural network that are activated for each of the at least one image; identifying an image as an informative training image in response to the number of neurons activated for the respective image satisfying a predetermined value; and updating the neural network with the informative training image in response to at least one object of the informative training image being manually labeled. The at least one image may be a plurality of images, where the predetermined value may be established based, at least in part, on a distribution of a number of neurons fired for the plurality of images. The predetermined value may be established such that only a subset of the plurality of images are informative training images.

Methods may include providing the image identified as an informative training image to a queue for manual labeling, and receiving the image identified as an informative training image including at least one labeled object within the image in response to the informative training image being manually labeled. Methods may include: receiving sensor data representative of a second image, where the second image includes an image of at least one object; and identifying, using the neural network, the at least one object in the second image automatically without manual input. Methods may optionally include providing for autonomous vehicle control based, at least in part, on identifying the object in the second image, where the second image is an image of an environment of a vehicle for which autonomous vehicle control is provided.

Embodiments described herein may provide an apparatus including: means for receiving sensor data from at least one image sensor, where the sensor data is representative of at least one image; means for processing the at least one image using a neural network; means for identifying a number of neurons of the neural network that are activated for each of the at least one image; means for identifying an image as an informative training image in response to the number of neurons activated for the respective image satisfying a predetermined value; and means for updating the neural network with the informative training image in response to at least one object of the informative training image being manually labeled. The at least one image may be a plurality of images, where the predetermined value may be established based, at least in part, on a distribution of a number of neurons fired for the plurality of images. The predetermined value may be established such that only a subset of the plurality of images are informative training images.

An example apparatus may include means for providing the image identified as an informative training image to a queue for manual labeling, and means for receiving the image identified as an informative training image including at least one labeled object within the image in response to the informative training image being manually labeled. The apparatus may optionally include: means for receiving sensor data representative of a second image, where the second image includes an image of at least one object; and means for identifying, using the neural network, the at least one object in the second image automatically without manual input. An example apparatus may optionally include means for providing for autonomous vehicle control based, at least in part, on identifying the object in the second image, where the second image is an image of an environment of a vehicle for which autonomous vehicle control is provided.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for the selection of training data for a neural network to facilitate automatic detection, in an image, of objects in an environment. In the context of mapping, objects or features of interest in the environment may include lanes, signs, obstacles, etc. Systems described herein, such as a perception system, may detect these features and objects in an environment and understand the features and objects in the context of the environment. In order for a perception system to reliably detect features and objects, large volumes of training data may be collected from a data capture platform and objects and features of images of the environment may be positively identified in order for the perception system to understand how to identify objects and features of the environment. Conventionally, humans may perform the positive identification of objects and features as manual labelers of objects and features in the images to generate training data for a perception system. Such manual labeling may be time consuming and costly, such that it is desirable to ensure the quality of the training data is high. High quality training data may be considered training data that provides valuable insight to a perception system through a neural network with respect to the identification of objects in an image.

A challenge with obtaining high quality training data is that a substantial volume of training data may be redundant or duplicative and fail to add substantial value to a perception system. Training data may lack different context and may be of little value for training a perception system. A neural network may not benefit from tens or hundreds of samples of the same object in the same weather and light conditions, while a hundred samples of different objects in varying weather and light conditions may be of substantial benefit. Objects such as signs along a road segment or lane lines may largely be captured in images that resemble one another, with substantial light on a clear day of a sign or lane line in good condition (e.g., not substantially weathered or deteriorated). However, in order to ensure that a data set is sufficiently diverse to provide value to a neural network, the data may be sampled in different weather conditions, under different light conditions, and in different geographical regions. Such heuristics, which may be user-defined, allow for richer datasets, but require specification of the heuristic function that needs to be optimized. Provided herein is an automated approach to dataset pruning in an online manner as a neural network is being trained. Embodiments described herein provide a training data sets of a higher quality and value to the neural network through diversification of the training data sets through elimination of data sets that are duplicative and provide substantially redundant information.

Figure 1:
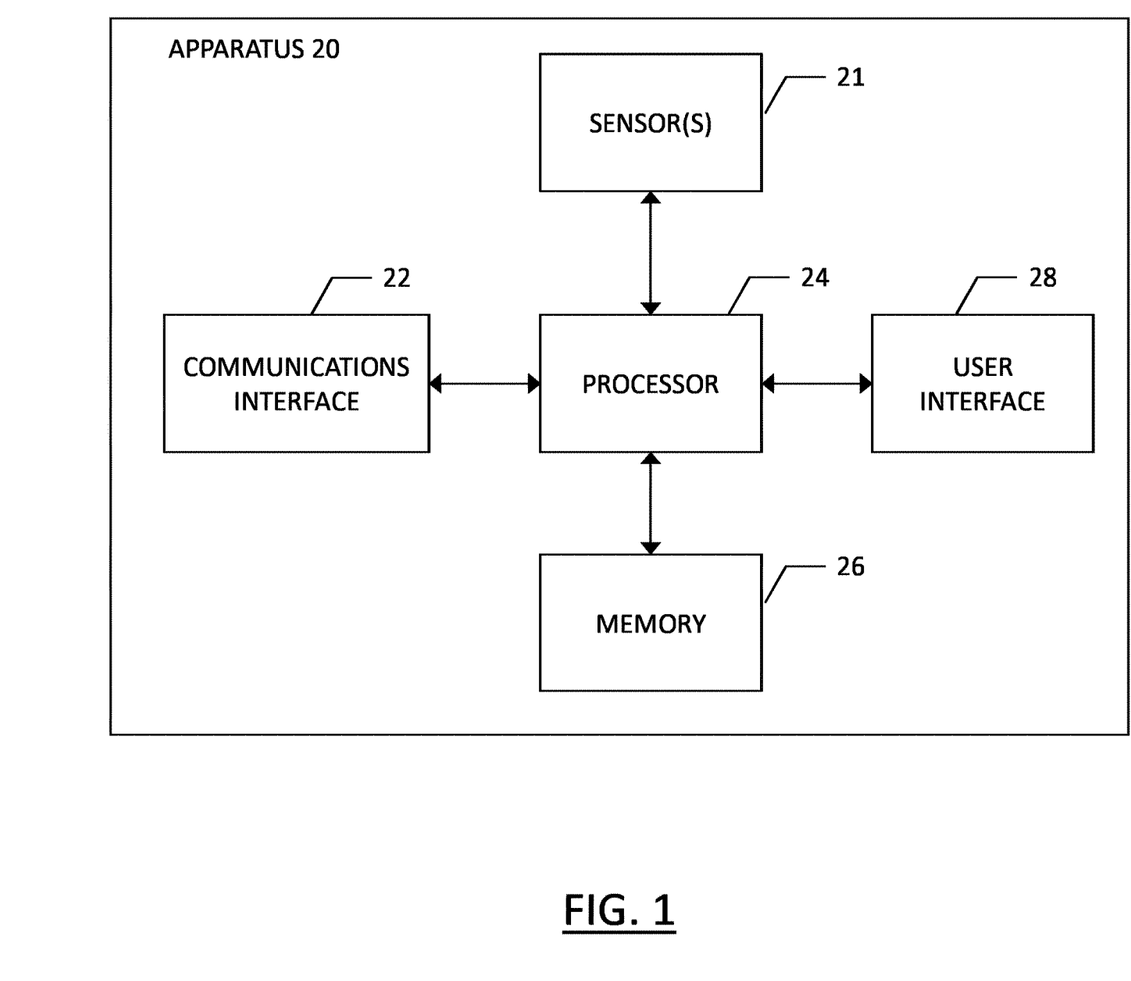
FIG. 1 is a block diagram of an apparatus according to an example embodiment of the present disclosure.

FIG. 1 is a schematic diagram of an example apparatus configured for performing some of the operations described herein, particularly the gathering of training data and for using the perception system for identifying objects in an image. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing object location using a perception system trained according to example embodiments described herein; however embodiments of the apparatus may be embodied or partially embodied as a mobile terminal, such as a personal digital assistant (PDA), mobile telephone, smart phone, personal navigation device, tablet computer, camera or any combination of the aforementioned systems. In an example embodiment for facilitating autonomous or partially autonomous vehicle control, the apparatus 20 may embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, locating signs and identifying information communicated by the sign, or any boundary related details of the road links that may be traversed by the vehicle.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. A perception system may be used to interpret the information gathered by the sensors, such as one or more image sensors, to identify objects and features of a roadway. The perception system may be trained through a neural network using training data that identifies objects and features to facilitate real-time identification of objects and features in an environment of the vehicle through the perception system. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle. Embodiments described herein may facilitate the building and updating of HD maps through the perception systems being able to reliably interpret features and objects along a road segment, and providing that data to a map services provider. Crowd sourced data from vehicles traveling along a roadway may provide object and feature information, or provide image data that is processed through a perception system of the map services provider to identify features and objects for map updates and generation.

Figure 2:
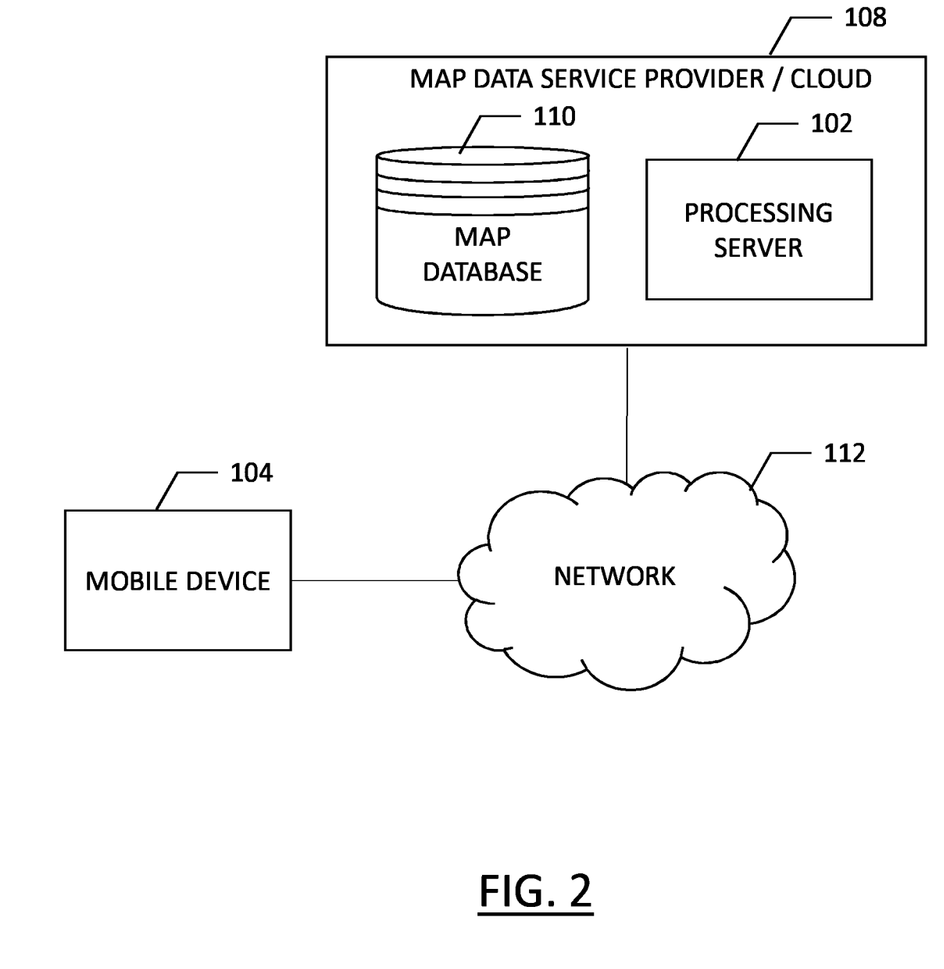
FIG. 2 is a block diagram of a system for generating learning data to facilitate automatically locating an object of interest within an image according to an example embodiment of the present disclosure.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example.

The map database 110 of example embodiments may be generated from a plurality of different sources of data. For example, municipalities or transportation departments may provide map data relating to road ways, while geographic information survey systems may provide information regarding areas beyond the road network. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to a several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein may broadly relate to computer vision when there is a need to establish the identification and position of an object or feature within an environment, as may be beneficial to the generation and confirmation of HD maps facilitating autonomous or semi-autonomous vehicle control. For example, objects and features along a road segment may be detected through processing of sensor data through a perception system. A perception system may discern objects and features within an environment and be capable of efficiently locating and classifying the objects according to the type of object. However, in order to efficiently locate and classify objects, a perception system may require training data from which object identification can be learned through a machine-learning technique in order to reliably and efficiently identify objects within an environment.

Training data for a perception system may be generated through initial image capture using, for example, sensors 21, and objects within the images may be manually labeled to create a positive and definitive identification of objects within the image. However, in order to train a perception system, a large volume of training data may be needed. Generally, the more training data used, the more accurate the perception system. However, repetitive training data may be of limited benefit since the information gleaned from repetitive training data may be minimal since repetitive training data may lack different context with which objects are presented. For example, training data including dozens or hundreds of samples of a single sign or of similar signs in similar environments under the same or similar contexts (e.g., clear weather with bright ambient light) may not provide enough diversity in the training data for a perception system to be able to determine how to identify objects in adverse contexts and environmental conditions, such as during night or twilight, or during inclement weather, for example. Training data including a plurality of different objects in a plurality of different environmental conditions and contexts may provide a large degree of diversity from which a perception system may be trained. Embodiments described herein ensure that a training data set is sufficiently diverse through sampling in different weather conditions and in different geographical regions. User-defined heuristics to ensure diversity allow for richer, more valuable datasets, but require specification of the heuristic function that needs to be optimized. Embodiments provided herein disclose an automated approach to dataset pruning in an online manner as the neural network for a perception system is being trained.

Embodiments of the present disclosure provide a method to automatically learn feature spaces, as defined by the neural network, as well as identify the most informative training examples. Once trained, the network can be used to prune datasets even before the manual labeling commences, thereby saving substantial manual labor/labeling costs and training time for new perception stacks. The pruning of training data as described herein ensures that high quality training data is used that is the most valuable to a perception system neural network in that the high quality training data provides the most information to the perception system neural network relative to training data that may be repetitive an of low relative value.

Embodiments described herein leverage a pre-trained network that is trained on outdoor scenes, and needs to be fine-tuned for the task of detecting environment features of interest. Each image in the training dataset for the neural network that needs to be labeled is fed through the network and the overall activation across the entire neural network is used to establish whether the training data is of high value, where the value represents the degree to which the neural network will learn from the training dataset.

Neural networks function based on the activation of artificial neurons, where the artificial neurons calculate a weighted sum of inputs to the neuron, adds a bias, and activates or "fires" if the output is sufficient. Embodiments described herein use the training data as inputs to the neural network, and the training data is evaluated by the neural network to determine if it is of sufficient value to the perception system to be manually labeled and used as training data for the perception system.

Each image in the training dataset that needs to be labeled is fed through the network, as noted above, and the overall activation or "firing" of the neurons in the neural network for each image is established. The number of neurons that fire in response to a specific input image, in conjunction with the value of the loss function is used as a measure of the information contained in the specific input data sample. The loss function is a measure of how good a prediction model performs in predicting the outcome, such that an image with manually labeled objects can be compared against an image with automatically labeled objects from the neural network to identify the value of the loss function. The distribution of the number of neurons fired for a specific dataset is used to define a threshold on the minimum number of neurons that need to fire, in order for a new image to be considered informative or valuable to the neural network. For any given new dataset, all of the images are fed through the network, and only the most informative images are retained to be passed on for manual labeling. Once labeled, the neural network of the perception system can be fine-tuned using the newly labeled images such that the measure of information gain from the datasets is encoded in the network.

As the training data is pruned and training data that is determined to be informative is fed to the neural network for training informs the neural network, the neural network changes to incorporate the most informative samples. In so doing, training data that was deemed to be sufficiently valuable and informative on a first pass through the neural network may not be sufficiently valuable and informative if the same or similar training data is received again, since the neural network may have learned enough about the feature space in the training data that it is no longer as valuable and informative as the first time it was processed by the neural network.

Figure 3:
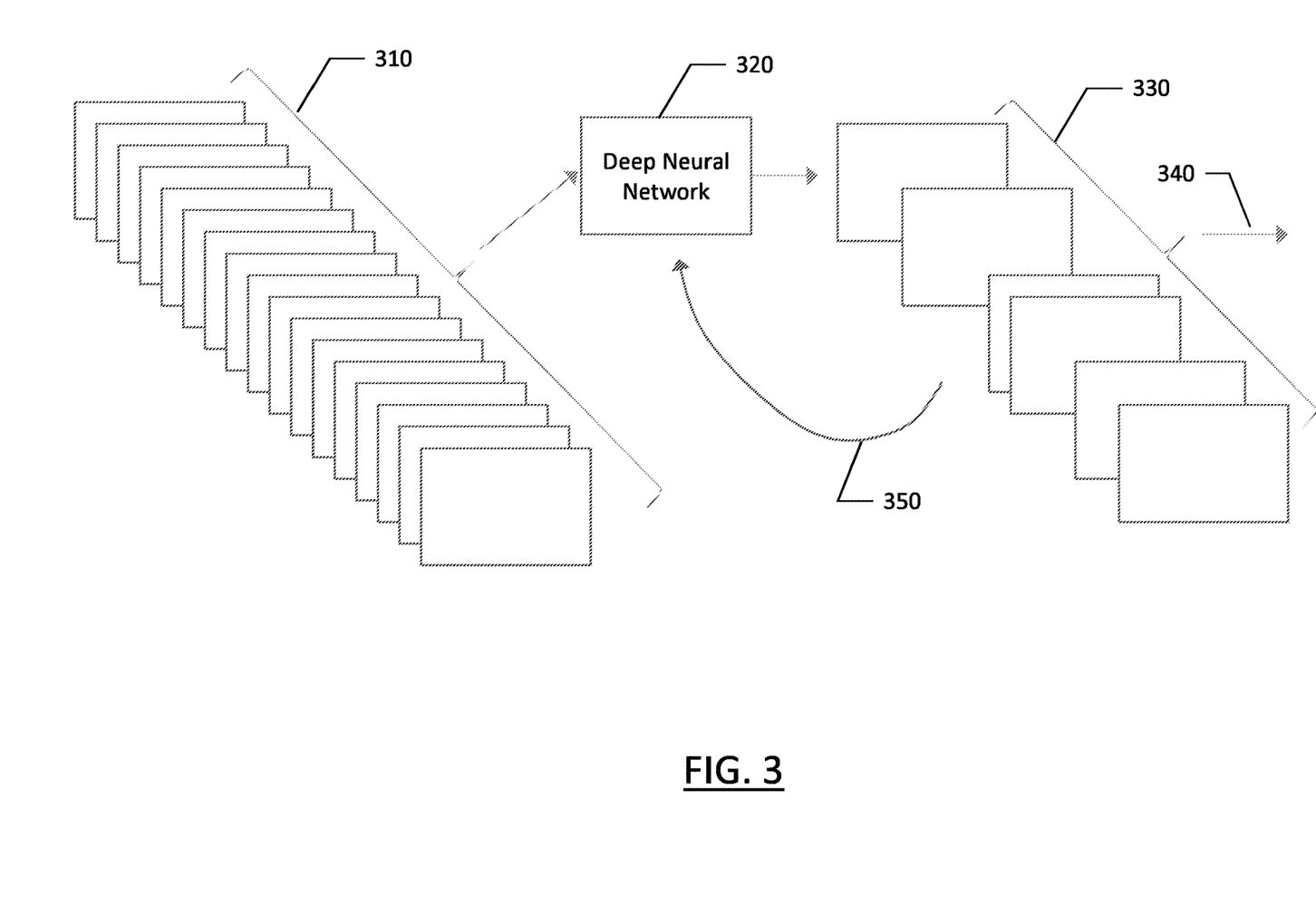
FIG. 3 illustrates a series of images of an object captured at different positions along a road segment according to an example embodiment of the present disclosure.

FIG. 3 illustrates an example embodiment in which a training dataset of images 310 is captured. These images 310 are fed into the deep neural network 320. The neural network determines the number of neurons that fire in response to each input image in conjunction with the value of the loss function, and a distribution of the number of neurons fired for the dataset of images 310 is used to define the minimum number of neurons that need to fire to establish an image as informative. Those images that result in a number of neurons firing above the threshold are output from the deep neural network 320 as dataset 330, where the dataset 330 of images is passed to manual labelers at 340. The number of samples or images in the dataset 330 that cause at least the minimum number of neurons to fire is significantly lower than the original dataset meaning that many of the images of the original dataset 310 were deemed not informative enough to substantially benefit the neural network 320 of the perception system. The images that are sent to the labelers at 340 are also provided to the deep neural network 320 at 350 to inform the neural network and to effect the number of neurons firing upon receipt of the next dataset based on the new dataset 330 which will be manually labeled and used by the perception system.

The image dataset 310 may be sensor data may be generated from a vehicle traveling along a road segment where the sensor includes an image sensor or a distance sensor, such as a LiDAR sensor. The sensor data may capture a plurality of images of the environment of the sensor as the vehicle carrying the sensor travels along the road segment. The images captured by the sensor may be captured periodically, such as every several seconds, every second, every fraction of a second, etc. The images may optionally be captured based on a sensor refresh rate at which images can be reliably captured. Further, the periodic capturing of an image by the sensor may be time based or may be based on a speed of the vehicle carrying the sensor. For example, images may be captured more frequently as the vehicle travels faster since the environment of the vehicle will be changing more rapidly. Those images that are deemed informative by the deep neural network 320 and passed on to the labelers 340 may be used to inform the neural network 320 of which future images are sufficiently informative to warrant manual labeling.

As described above, HD maps may be instrumental in facilitating autonomous vehicle control. Building the HD maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps, and to facilitate autonomous control of the vehicle generating the sensed data. The sensors may be used to capture sensor data within which objects are present. Certain objects detected by the sensors may be critical for facilitating autonomous control of a vehicle, such as roadway boundaries, lane lines, and road signs including information contained on the road signs. Detecting these features reliably and repeatably may be instrumental in safe autonomous vehicle control.

Object or feature detection using detectors that receive sensed data from a plurality of sensors may employ discrete-search techniques to approximate the location of an object, such as a sign. According to example embodiments described herein, sensor data is captured by sensors associated with one or more vehicles as they travel along a road segment, and processed by the neural network to establish if the image is sufficiently informative for the neural network to be used as training data. In concert with this operation, the perception system, using the neural network 320 that is informed by the training data that is manually labeled, may be used to automatically identify objects in images captured by the sensor of the vehicles. As such, while image data may be processed by the neural network to determine whether the image is sufficiently informative for the neural network, the same images may be processed by the perception system neural network to identify and classify objects within the images to facilitate autonomous vehicle control and/or for map building/updating.

According to example embodiments described herein, the role of HD maps in facilitating autonomous or semi-autonomous vehicle control may include crowd-sourced building of the maps to identify and confirm features and objects of the maps and their respective locations. In the context of map-making, the features from the environment may be detected by a perception system of a map services provider or a vehicle traveling along a road segment and consolidated to form a representation of the actual real-world environment in the form of a map.

Figure 4:
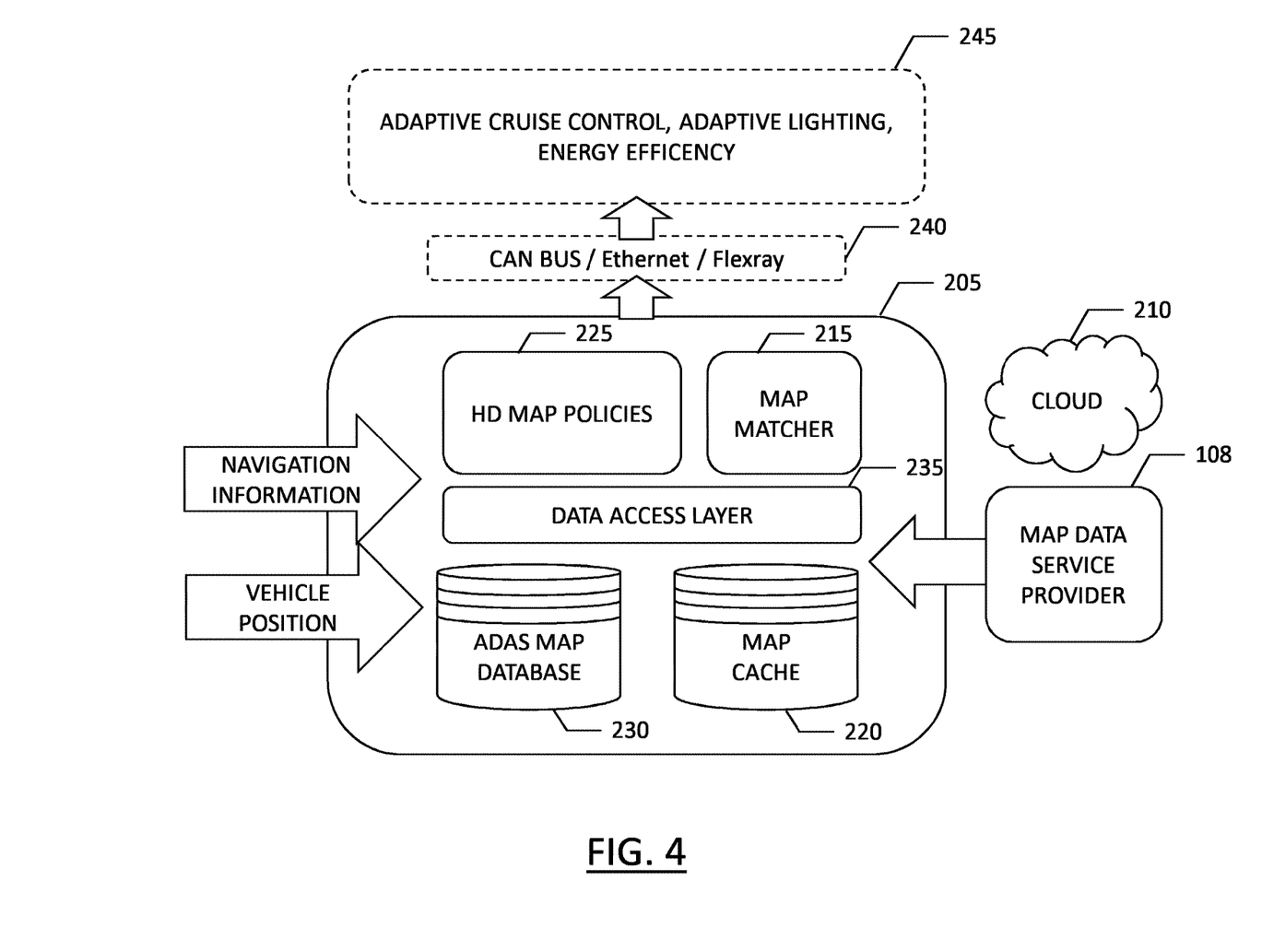
FIG. 4 is a block diagram of a system for implementing the methods described herein generating learning data to facilitate automatically locating an object of interest within an image and providing for autonomous control of a vehicle responsive thereto according to an example embodiment of the present disclosure.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors, in cooperation with the perception system, may be used to detect features of an environment to facilitate autonomous and semi-autonomous driving. The sensors may be part of a detection module or perception module which may feature a plurality of sensors to obtain a full interpretation of the environment of the module and the vehicle associated therewith. The perception system may be on-board a vehicle or located remotely, such as at a map data service provider, and may provide substantially real-time object identification and location to facilitate autonomous or semi-autonomous vehicle control FIG. 4 illustrates an example embodiment of architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other locationing means and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). Further, signs along the road segment may be used to understand rules of operation along the road segment, and to identify changes to traffic flows which may be communicated via signs. The information from signs and their location along road segments may inform policies that govern how a vehicle is to traverse a road segment and these policies may be stored, for example, in an HD map of the region. The HD map policies associated with the road segment may be provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment. A vehicle with autonomous or semi-autonomous control may detect features in the environment of the vehicle using a perception system trained according to embodiments described herein to facilitate the autonomous or semi-autonomous control. Sensor redundancy may be used to provide additional confirmation relating to features and objects of the environment and to improve detection and reliability of vehicle interpretation of the surrounding environment. In order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs). The vehicle context may be interpreted based on sensor observations that are passed through a perception module to understand the content of the observed environment. The perception module's set of detectors may correspond to deep-neural network based methods of understanding features in the environment and identifying a location of the features in the environment. Embodiments described herein include a method to improve the performance of detecting features and objects in an environment and properly locating them in the environment beyond conventional methods relying on human, manual labeling of objects in all image datasets as many of these images may not provide the informative value to the neural network provided by those that satisfy the neural network thresholds described above.

Figure 5:
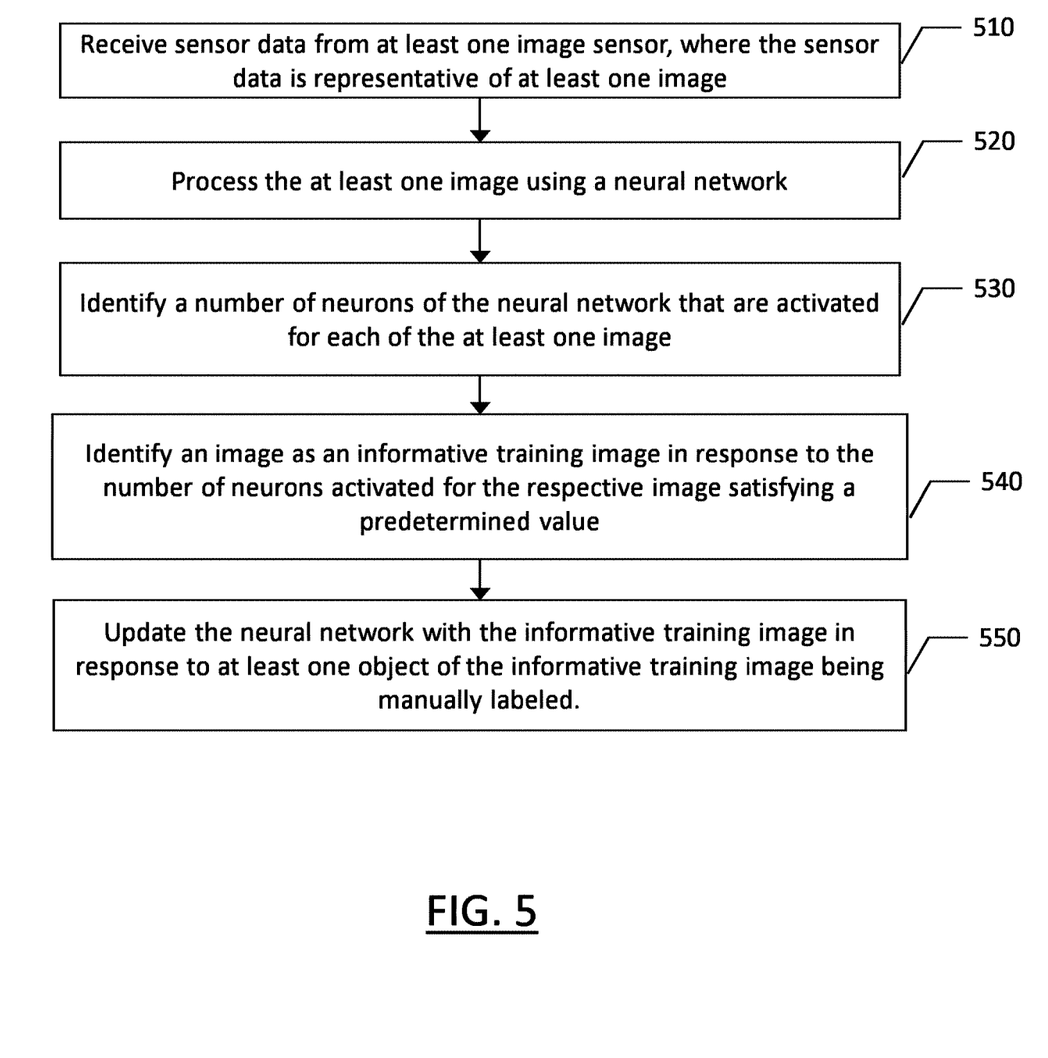
FIG. 5 is a flowchart of operations for generating learning data to facilitate automatically locating an object of interest within an image according to an example embodiment of the present disclosure.

FIG. 5 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 is a flowchart of a method for culling training data for machine learning in a neural network, and more particularly, to automatically identifying the most informative training data examples and culling training data that is of limited benefit for the neural network. As shown, at 510, sensor data is received from at least one image sensor, where the sensor data is representative of at least one image. The image is processed at 520 using a neural network. At 530, a number of neurons within the neural network that are activated for each image is identified. An image is identified, at 540, as an informative training image in response to the number of neurons activated for the respective image satisfying a predetermined value. The neural network is updated at 550 with the informative training image in response to the informative training image having at least one object manually labeled.

In an example embodiment, an apparatus for performing the method of FIG. 5 above may comprise a processor (e.g., the processor 24) configured to perform some or each of the operations (510-550) described above. The processor may, for example, be configured to perform the operations (510-550) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-550 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive sensor data from at least one image sensor, wherein the sensor data is representative of at least one image;
   process the at least one image using a neural network;
   identify a number of neurons of the neural network that are activated for each of the at least one image;
   identify an image of the at least one image as an informative training image in response to the number of neurons activated for the respective image satisfying a predetermined value; and
   update the neural network with the informative training image.

2. The apparatus of claim 1, wherein the apparatus is further caused to establish the predetermined value based, at least in part, on a distribution of a number of neurons fired for a plurality of images applied to the neural network.

3. The apparatus of claim 2, wherein the predetermined value is established such that only a subset of the plurality of images are informative training images.

4. The apparatus of claim 1, wherein the apparatus is further caused to:
   provide the image identified as an informative training image to a queue for manual labeling; and
   receive the image identified as an informative training image including at least one labeled object within the image in response to the informative training image being manually labeled.

5. The apparatus of claim 1, wherein the apparatus is further caused to:
   receive sensor data representative of a second image, wherein the second image comprises an image of at least one object; and
   identify, using the neural network, the at least one object in the second image automatically without manual input.

6. The apparatus of claim 5, wherein the apparatus is further caused to:
   provide for autonomous vehicle control based, at least in part, on identifying the object in the second image, wherein the second image is an image of an environment of a vehicle for which autonomous vehicle control is provided.

7. The apparatus of claim 5, wherein the apparatus is further caused to:
   provide for a map update to a digital map in a map database based, at least in part, on identifying the at least one object in the second image.

8. A computer program product comprising at least one non-transitory computer-readable storage medium having computer-executable program code instructions stored therein, the computer-executable program code instructions comprising program code instructions to:
  receive sensor data from at least one image sensor, wherein the sensor data is representative of at least one image;
  process the at least one image using a neural network;
  identify a number of neurons of the neural network that are activated for each of the at least one image;
  identify an image of the at least one image as an informative training image in response to the number of neurons activated for the respective image satisfying a predetermined value; and
  update the neural network with the informative training image.

9. The computer program product of claim 8, further comprising program code instructions to establish the predetermined value based, at least in part, on a distribution of a number of neurons fired for a plurality of images applied to the neural network.

10. The computer program product of claim 9, wherein the predetermined value is established such that only a subset of the plurality of images are informative training images.

11. The computer program product of claim 8, further comprising program code instructions to:
  provide the image identified as an informative training image to a queue for manual labeling; and
  receive the image identified as an informative training image including at least one labeled object within the image in response to the informative training image being manually labeled.

12. The computer program product of claim 8, further comprising program code instructions to:
  receive sensor data representative of a second image, wherein the second image comprises an image of at least one object; and
  identify, using the neural network, the at least one object in the second image automatically without manual input.

13. The computer program product of claim 12, further comprising program code instructions to:
  provide for autonomous vehicle control based, at least in part, on identifying the object in the second image, wherein the second image is an image of an environment of a vehicle for which autonomous vehicle control is provided.

14. The computer program product of claim 12, further comprising program code instructions to:
  provide for a map update to a digital map in a map database based, at least in part, on identifying the at least one object in the second image.

15. A method comprising:
  receiving sensor data from at least one image sensor, wherein the sensor data is representative of at least one image;
  processing the at least one image using a neural network;
  identifying a number of neurons of the neural network that are activated for each of the at least one image;
  identifying an image of the at least one image as an informative training image in response to the number of neurons activated for the respective image satisfying a predetermined value; and
  updating the neural network with the informative training image.

16. The method of claim 15, further comprising establishing the predetermined value based, at least in part, on a distribution of a number of neurons fired for a plurality of images applied to the neural network.

17. The method of claim 16, wherein the predetermined value is established such that only a subset of the plurality of images are informative training images.

18. The method of claim 15, further comprising:
  providing the image identified as an informative training image to a queue for manual labeling; and
  receiving the image identified as an informative training image including at least one labeled object within the image in response to the informative training image being manually labeled.

19. The method of claim 15, further comprising:
  receiving sensor data representative of a second image, wherein the second image comprises an image of at least one object; and
  identifying, using the neural network, the at least one object in the second image automatically without manual input.

20. The method of claim 19, further comprising providing for autonomous vehicle control based, at least in part, on identifying the object in the second image, wherein the second image is an image of an environment of a vehicle for which autonomous vehicle control is provided.

* * * * *